(12) United States Patent
Lazzari et al.

(10) Patent No.: US 11,358,690 B2
(45) Date of Patent: Jun. 14, 2022

(54) COMMAND AND CONTROL ASSEMBLY FOR INFLATING AND DEFLATING A HYDROSTATIC BALANCING JACKET

(71) Applicant: Mares S.p.A., Rapallo (IT)

(72) Inventors: Marco Lazzari, Rapallo (IT); Sergio Angelini, Lavagna (IT); Luciano Avataneo, Rapallo (IT); Pierfrancesco Iodice, Rapallo (IT)

( * ) Notice: Subject to any disclaimer, the term of this patent is extended or adjusted under 35 U.S.C. 154(b) by 176 days.

(21) Appl. No.: 16/816,098

(22) Filed: Mar. 11, 2020

(65) Prior Publication Data
US 2020/0290711 A1 Sep. 17, 2020

(30) Foreign Application Priority Data
Mar. 13, 2019 (IT) .......................... 102019000003641

(51) Int. Cl.
| | |
|---|---|
| *B63C 11/08* | (2006.01) |
| *B63C 11/22* | (2006.01) |
| *F16K 24/04* | (2006.01) |

(52) U.S. Cl.
CPC .......... *B63C 11/08* (2013.01); *B63C 11/2245* (2013.01); *F16K 24/04* (2013.01); *B63C 2011/085* (2013.01)

(58) Field of Classification Search
CPC ....... B63C 9/1255; B63C 9/155; B63C 11/08; B63C 2011/085
USPC ................................ 405/186; 441/90, 92, 96
See application file for complete search history.

(56) References Cited

U.S. PATENT DOCUMENTS

| | | | |
|---|---|---|---|
| 4,045,835 A | | 9/1977 | Flam |
| 4,379,656 A | * | 4/1983 | Darling .................... B63C 11/08 128/204.24 |
| 4,529,333 A | * | 7/1985 | Robinette ............... B63C 11/08 405/186 |
| 5,256,094 A | * | 10/1993 | Canna ..................... B63C 11/08 405/186 |
| 5,408,993 A | * | 4/1995 | Gomez .................... B63C 11/08 128/200.24 |

(Continued)

FOREIGN PATENT DOCUMENTS

| | | | | |
|---|---|---|---|---|
| DE | 3644742 A1 | * | 7/1987 | ............. B63C 11/08 |
| EP | 0615899 A2 | * | 9/1994 | ............. B63C 11/08 |

(Continued)

OTHER PUBLICATIONS

Italian Search Report, dated Sep. 5, 2019 (Relevant sections are in English).

*Primary Examiner* — Frederick L Lagman
(74) *Attorney, Agent, or Firm* — Themis Law

(57) ABSTRACT

A command and control assembly for inflating and deflating a hydrostatic balancing jacket includes a primary supply duct connected to an end of an air chamber of the jacket and provided, at the opposite end, with a hand piece having a mouthpiece device. A connection socket is provided on the hand piece, which is in fluid communication with a secondary supply duct connected to a compressed air tank, and a pneumatic actuation duct actuates a discharge valve of the jacket, which is in fluid communication with the secondary supply duct. Control systems of the delivery from the secondary duct, of the delivery to the pneumatic actuation duct, and of the delivery from the mouthpiece are arranged on the hand piece.

4 Claims, 5 Drawing Sheets

(56) References Cited

U.S. PATENT DOCUMENTS

| | | | |
|---|---|---|---|
| 5,520,485 A | | 5/1996 | Hermansen |
| 5,788,415 A | * | 8/1998 | Chen ..................... B63C 11/26 |
| | | | 128/201.28 |
| 6,592,298 B2 | * | 7/2003 | Beltrani .............. B63C 11/2245 |
| | | | 405/186 |

FOREIGN PATENT DOCUMENTS

| | | | | |
|---|---|---|---|---|
| EP | 0721883 A1 | * | 7/1996 | ......... B63C 11/2245 |
| EP | 1186529 A2 | * | 3/2002 | ......... B63C 11/2245 |
| JP | H01218996 | | 9/1989 | |
| WO | WO-9937534 A2 | * | 7/1999 | ............. B63C 11/32 |

* cited by examiner

COMMAND AND CONTROL ASSEMBLY FOR INFLATING AND DEFLATING A HYDROSTATIC BALANCING JACKET

FIELD OF THE INVENTION

The present invention relates to hydrostatic balancing jackets for scuba diving, and, in particular, to a command and control unit for inflating and deflating a hydrostatic balancing jacket.

BACKGROUND OF THE INVENTION

For several decades until now, hydrostatic balancing jackets have been used in underwater practice that involves the use of breathing apparatus. This tool is used to stabilize the buoyancy of the diver and is normally equipped with inflation means as well as one or more discharge valves. By suitably acting on the quantity of air introduced into the chambers of the jacket, the diver can maintain a neutral balance with varying depth.

A balancing jacket is known from document U.S. Pat. No. 4,720,281 in which the inflation means provide a first supply duct connected to an admission valve of the air chamber of the jacket, to which a second supply duct connected to a cylinder is in turn connected. compressed air, means for controlling the delivery from said second conduit being provided, and said first conduit being provided with mouthpiece means, at the opposite end to that connected to the jacket; an air discharge valve from the jacket being also provided with mechanical control means, integrated in said first duct.

This type of solution presents two types of problems; the first is that there is only one jacket discharge valve, generally corresponding to the air supply valve, and located near the upper region of the jacket. This involves problems related to the position of the user when he has to carry out the discharge, which should be substantially with the head up. The other problem is related to the mechanical control of the discharge valve, which actually makes it more complex to adopt multiple discharge valves, given the complication of the actuation means that would be necessary for use.

Document EP0921064 describes a balancing jacket equipped with a plurality of pneumatically controlled discharge valves. This solution overcomes most of the problems set out above, however a clear answer is not given with respect to the positioning of the control means of the valves, and the organization of all controls on which the diver must act to regulate the pressure of his jacket.

SUMMARY OF THE INVENTION

An object of the present invention is, therefore, to provide a solution that allows the command and control of the inflation and deflation of the jacket organized in a simple and compact way, and capable of allowing the user operations in the simplest and most immediate way possible.

A subject of the present invention is, therefore, a command and control unit for the inflation and deflation of a hydrostatic balancing jacket, comprising a primary supply conduit, connected at one end to the air chamber of the jacket, and provided at the opposite end of a handpiece provided with mouthpiece means, a connection socket to a secondary supply conduit connected to a compressed air cylinder being provided on said handpiece, and a pneumatic actuation conduit for the discharge valves of said jacket being provided, in communication fluid with said secondary supply conduit, the delivery control means for inflating from said secondary conduit, for deflating from said pneumatic actuation conduit, and from said mouthpiece means for both operations being provided on said handpiece.

In a preferred embodiment, said pneumatic actuation conduit is coaxial with said primary supply conduit, and inserted inside the same.

BRIEF DESCRIPTION OF THE DRAWINGS

Further advantages and characteristics of the device according to the present invention will appear more clearly from the following description of some exemplary embodiments, not intended for limitative purposes, with reference to attached drawing, in which.

DETAILED DESCRIPTION OF EMBODIMENTS OF THE INVENTION

Figure 1:
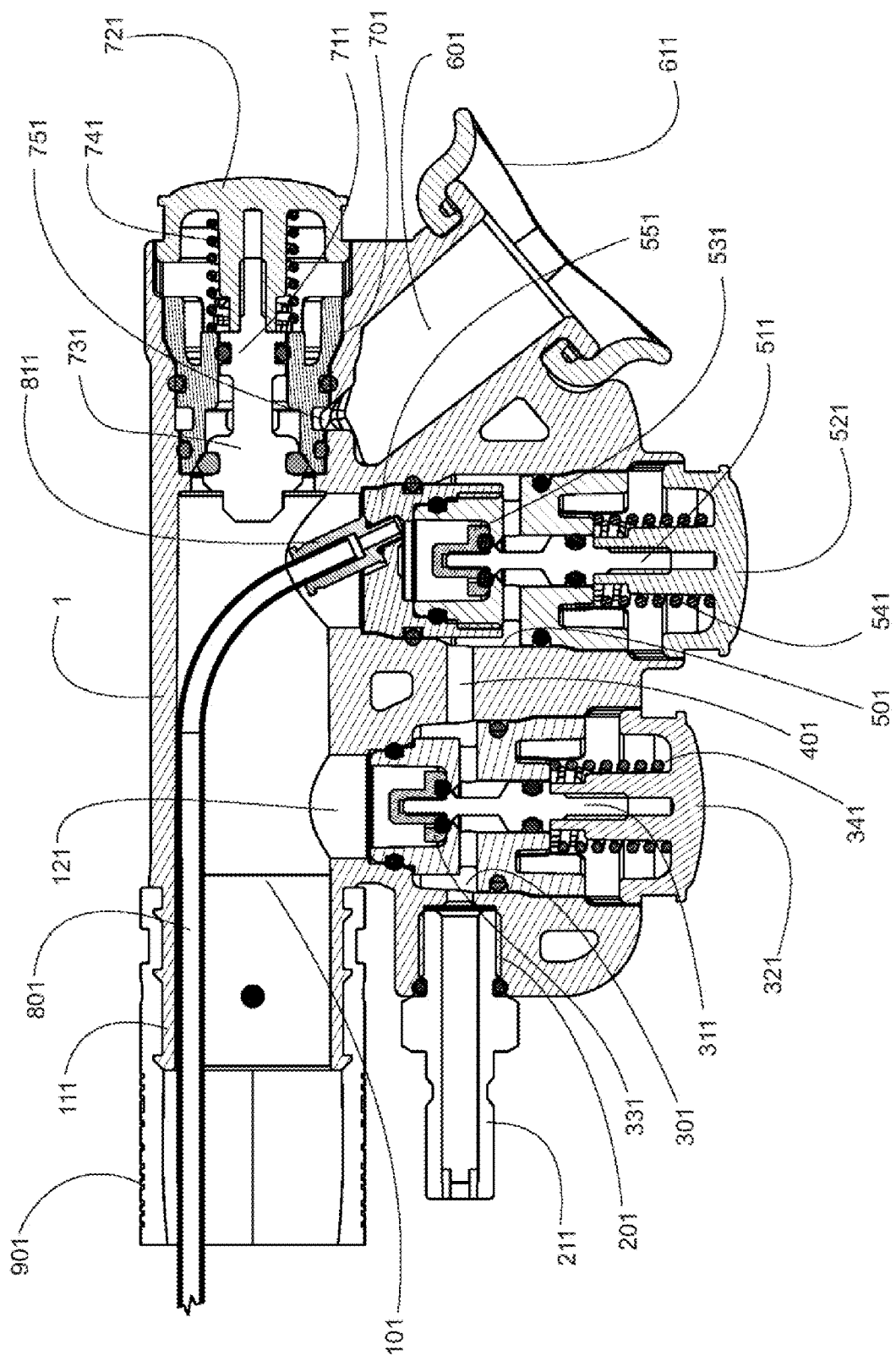
FIG. 1 is a longitudinal section view of a first embodiment of the command and control unit according to the present invention.

FIG. 1 shows a first embodiment of the command and control group according to the invention; numeral 1 indicates the body of the handpiece, which has an axial duct 101 which at one end has a union duct 111 connected to the end of the primary duct 901 for supplying the air chamber of the jacket, not shown in the figure, while at the end on the opposite side there is provided a seat 701 in which a valve is located, whose stem 711 is controlled by a button 721, provided with elastic loading means 741, and operates a shutter 731 which allows or does not allow the communication through the passage 751 between the conduit 101 and the conduit 601 which ends with the mouthpiece 611.

A seat 201 is formed parallel to the conduit 101 in which the bush 211 is coupled connected to a medium pressure hose (not shown) of a first reducer stage which is in turn connected to a compressed air cylinder, which pours the air supplied into the seat 301 of a valve whose stem 311 is operated by means of the button 321, which is provided with elastic loading means 341, and which controls the shutter 331, and allows the inflow of air for inflation purposes to the duct 121 radial with respect to the duct 101.

Juxtaposed with respect to the seat 301, and communicating with it through the conduit 401, the seat 501 of a valve is formed whose stem 511 is operated by the button 521, which is provided with the elastic loading means 541, and which controls the shutter 531 and which allows the inflow of air to the end 811 of the pneumatic actuation duct 801 of the exhaust valves of the jacket, not shown in the figure. Advantageously, the valves inserted in seats 301 and 501 have identical structure, except for the fact that in the portion of the seat 501 facing the conduit 101 there is the support 551, which allows the seal connection with the end 811 of the conduit 801. All the valves are preloaded by the respective elastic loading means in the normally closed position.

Figure 2:
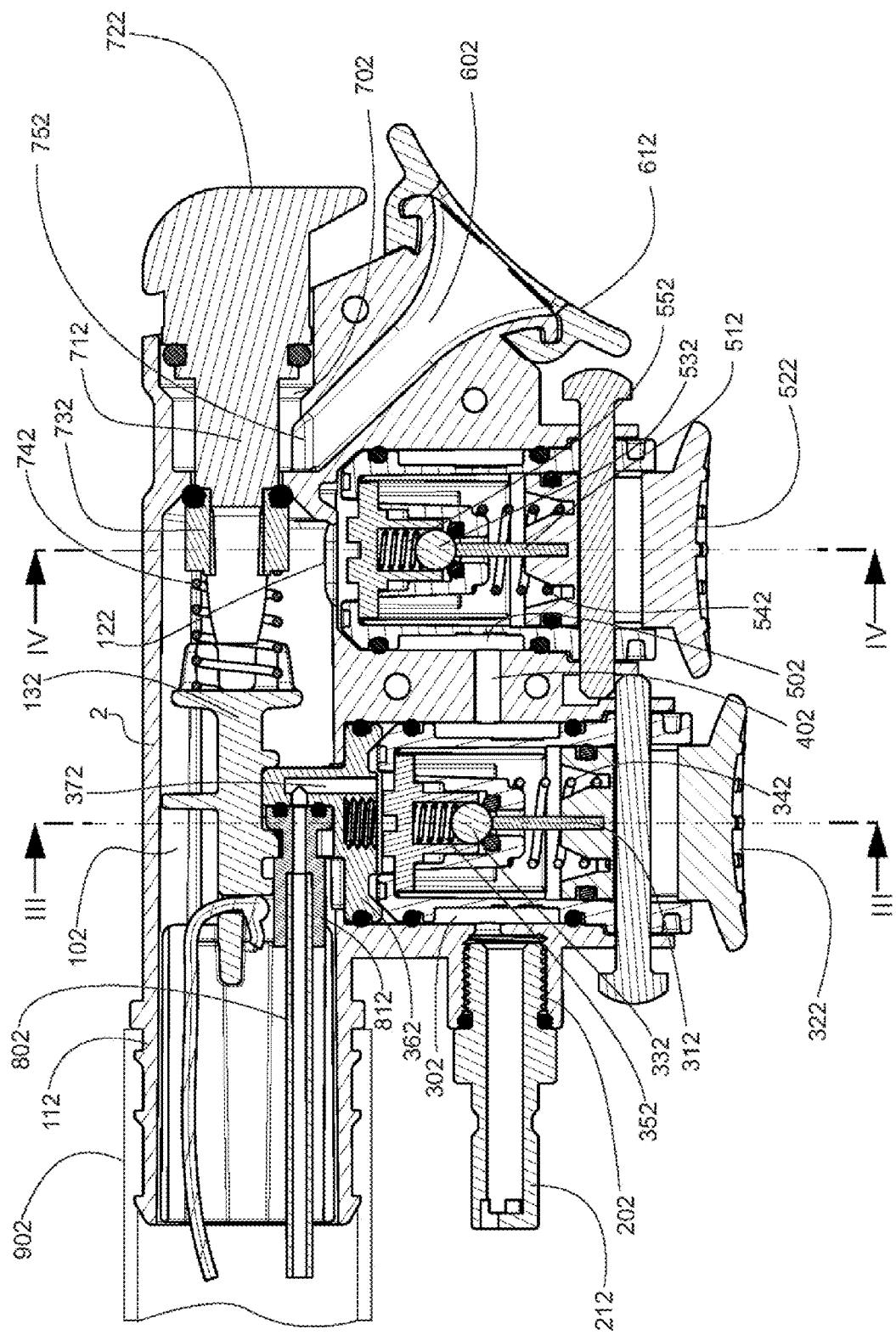
FIG. 2 is a longitudinal section view of a second embodiment of the command and control unit according to the present invention.

FIG. 2 shows a second embodiment of the command and control group according to the invention; numerals 2 indicates the body of the handpiece, which has an axial duct 102 which at one end has a union duct 112 connected to the end of the primary duct 902 for supplying the air chamber of the jacket, not shown in the figure, while at the end on the opposite side there is provided a seat 702 in which a valve is located, the stem 712 of which is controlled by a button 722, provided with elastic loading means 742 which abut on the support 132, and operates a shutter 732 which allows or does not allow the communication through the passage 752 between conduit 102 and conduit 602 ending with the mouthpiece 612.

The seat 202 is formed parallel to the conduit 102 in which the bush 212 is coupled which is connected to a medium pressure hose (not shown) of a first reducing stage which is in turn connected to a compressed air cylinder, which pours the air supplied into the seat 302 of a valve whose stem 312 is operated by means of the push button 322, provided with elastic loading means 342, and which controls the shutter 332, i.e. the sphere loaded by the spring 352 and which allows the air to flow to the end 812 of the duct 802 for pneumatic actuation of the exhaust valves of the jacket, not shown in the figure.

Juxtaposed with respect to the seat 302, and communicating with it through the conduit 402, the seat 502 of a valve is formed whose stem 512 is operated by the button 522, which is provided with the elastic loading means 542 and controls the shutter 532, i.e. the ball loaded by the spring 552, and which allows the inflow of air for inflation to the radial duct 122 with respect to the duct 102. Advantageously, the valves inserted in the seats 302 and 502 have identical structure, except for the fact that in the portion of the seat 302 turned towards the conduit 102 there is the support 362, which allows, through the conduit 372, the seal connection with the end 812 of the conduit 802. All the valves are preloaded by the respective elastic loading means in the normally closed position.

Figure 3:
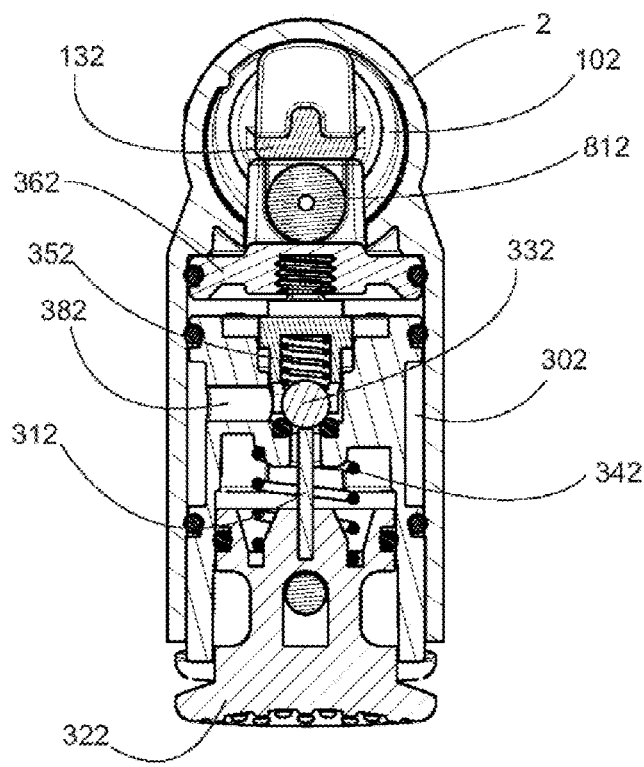
FIG. 3 is a cross-sectional view along the line III-III of FIG. 2.

FIG. 3 shows a section view along the line III-III of FIG. 2; to the equal parts in FIG. 2 correspond equal numerals. The figure shows the passage 382 which allows the flow of air from the seat 302 to the shutter 332. Similarly, in FIG. 4, which represents the section along the line Iv-Iv of FIG. 2, the duct 562 is highlighted which allows the flow of air from the seat 502 to the shutter 532.

The operation of the command and control unit according to the present invention will appear evident from the following. In respect to the state of the art discussed in the introduction, the solution provided by the present invention solves most of the problems and considerably simplifies the operation of the diver, which must probably be reduced as much as possible.

With reference to the embodiment shown in FIG. 1, if it is decided to increase the pressure, or the volume, of the air chamber of the jacket, the diver will press the button 321 of the valve 301 and therefore will allow the flow of air coming from the bush 211 in the conduit 101, and from there to the conduit 901 and the air chamber of the jacket, until the desired and optimal inflation level is reached.

When it is instead considered appropriate to deflate the jacket, the pressure exerted on the button 521 of the valve 501 will make the air flow to the duct 801, and the air will allow the pneumatic opening of the exhaust valves, in a way known per se, for example as illustrated and described in the document EP0921064 already mentioned above.

The actuation of the button 721 of the valve 701 can be practiced either to inflate by mouth (as an alternative to the use of compressed air in the cylinder) or to deflate. This is an alternative to the use of compressed air in the cylinder for inflating, or in an emergency, in the event that, as a result of problems of shortage or poor distribution, the air does not reach the duct 101 and from there to the duct 901 from bush 211.

The certainly innovative aspect of the present invention is represented by grouping the controls for compressed air inflation, mouth inflation, pneumatic deflation and manual deflation in a single element. In particular, for the inflation of the air chamber of the jacket by means of compressed air, through the valve 301 and the conduit 121 relating to the conduit 101, and for the deflation through the pneumatic actuation of the discharge valves, operated through the conduit 801, which for simplicity and for greater safety is arranged inside the tube 901 for supplying the inner tube. This result is obtained by putting the two seats 301 and 501 of the respective valves in fluid communication through the conduit 401.

To simplify the connection of the end 811 of the conduit 801, and to more effectively differentiate the two control buttons, the seat 501 is made in such a way that the button 521 protrudes radially towards the outside of the body 1 in a more relevant way than at button 321 of seat 301.

Figure 4:
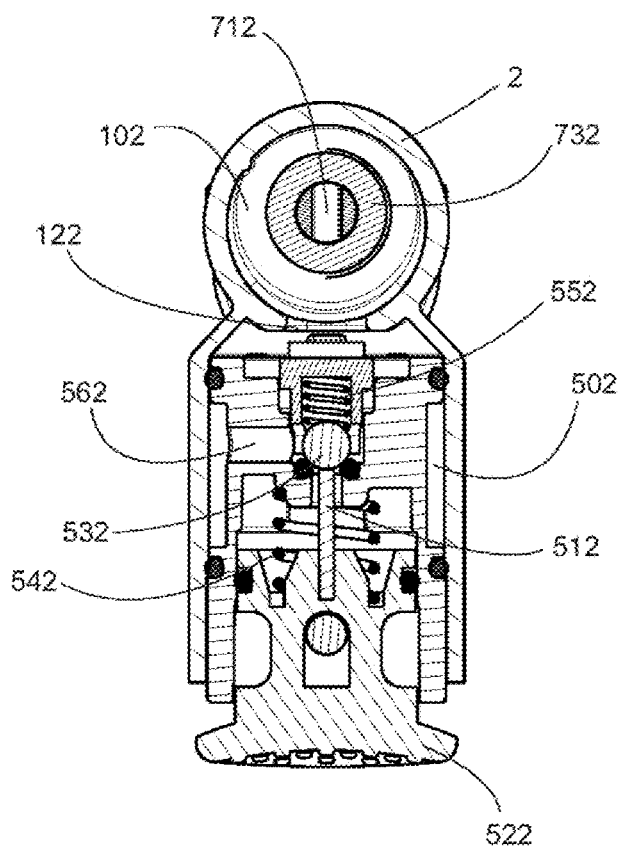
FIG. 4 is a cross-sectional view along the line IV-IV of FIG. 2.

In the alternative embodiment illustrated in FIGS. 2 to 4, the positioning of the seat 302 of the valve which controls the flow of air to the duct 802 near the seat 202 of the supply duct 212 makes it possible not to have to bend said duct 802, and therefore allows a better distribution of the spaces inside the body 2 of the handpiece. In addition, the presence of the support 132 inside the duct 102 allows controlling the shutter 732 more effectively, in addition to making the passage 752 more simply formed. Furthermore, the two valves used in seats 302 and 502 guarantee better flow control than those used in the embodiment previously described and illustrated in FIG. 1.

The command and control unit conceived according to the above concept is therefore easy to use by the diver, who can operate it with one hand, and ensures precise control of the inflation and deflation of the inner tube. In particular, deflation can be carried out in any position with an easily available command, alternatively having to position the mechanism for the mechanical actuation of the discharge valve in the minimum depth position, given that the pneumatic actuation acts on two valves placed at the top and bottom on the jacket, equipped with a non-return valve, so that the one positioned at the top drains and the other, although open, does not allow water to enter. It is also a compact device and not particularly sophisticated in construction, which also has the advantage of rationally grouping the commands it includes.

Figure 5:
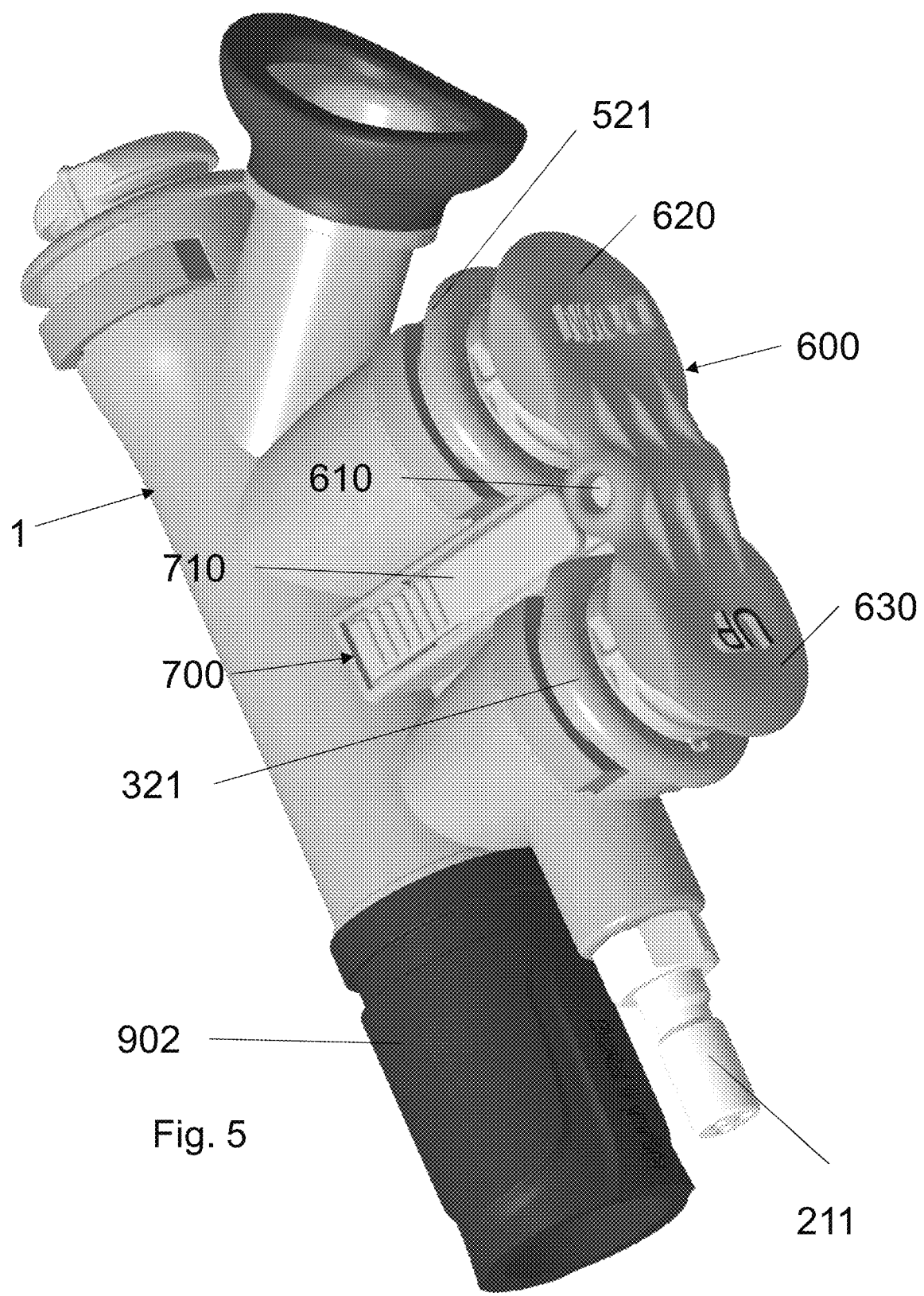
FIGS. 5 and 6 show a perspective view and respectively a longitudinal section view analogous to the one of FIGS. 1 and 2, respectively, of a third embodiment of the present invention adding further comfort in handling the present command and control assembly.
Figure 6:
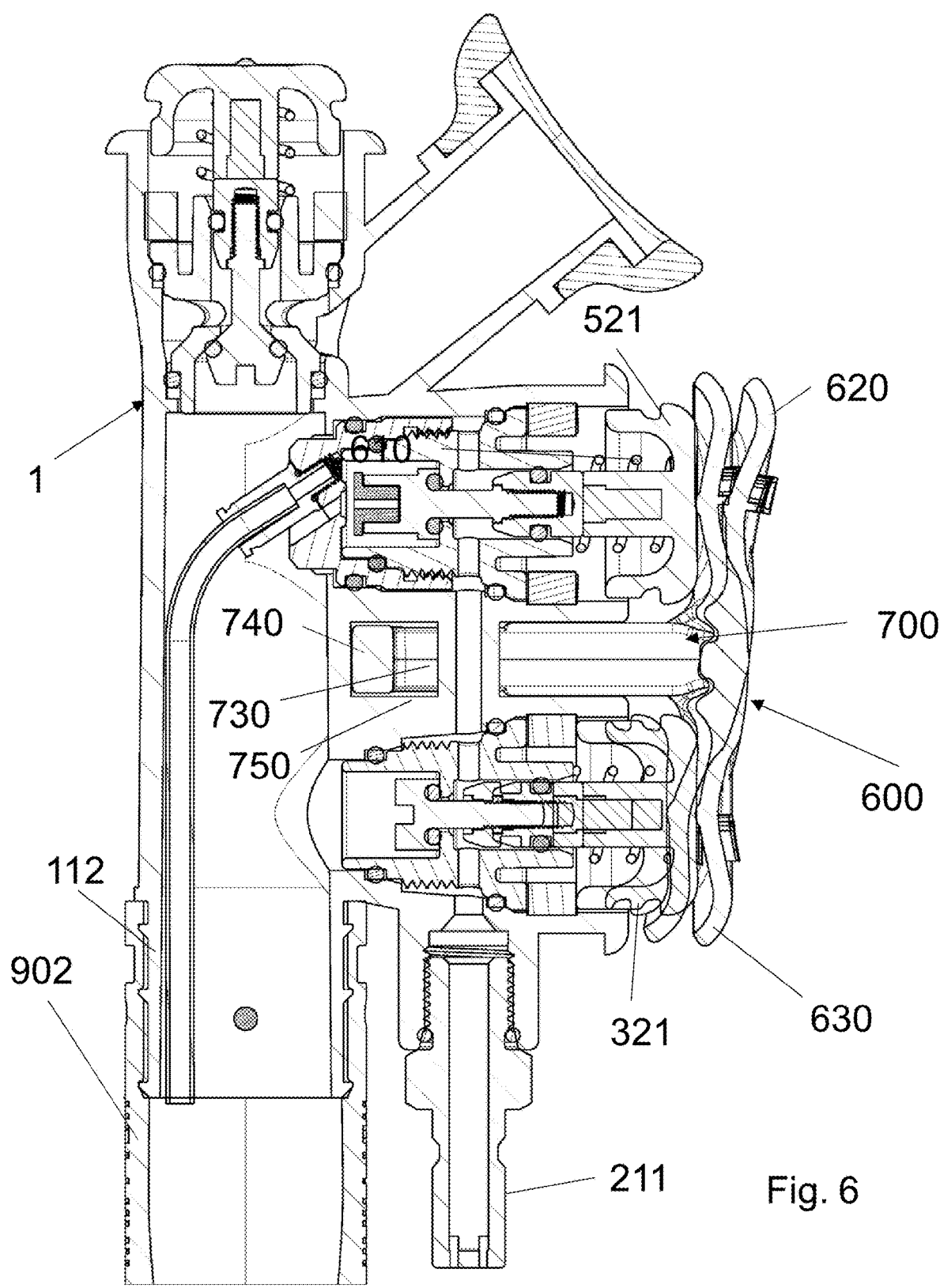

According to a third embodiment illustrated in FIGS. 5 and 6, the command and control assembly of this embodiment adds further features facilitating the handling of the said assembly for commanding inflation and discharge of the air chamber of the jacket.

According to this embodiment the construction of the ducts, the valves and the buttons for operating the valves is essentially identical to the one of FIG. 1. The said parts are not described in these figures since reference can be made directly to the description of FIG. 1. Only new added features or parts are described and indicated with specific numerals. Furthermore, as it will appear clearly from the following detailed description, the features of the embodiment according to FIGS. 5 and 6 can be provided also in combination with a command and control assembly of the embodiment according to FIGS. 2 to 4, since it does not affect the internal construction of the ducts, of the valves and of the actuation organs such as the buttons operating the valves.

According to this embodiment, the two valves one for controlling the inflation of the air chamber and the other for controlling the discharge valves of the air chamber are operated by means of a unique actuation organ, the two valves comprising each an actuation button 321, 521 and the said buttons being placed one beside the other at a certain distance, a rocker lever 600 being provided which is supported oscillating around an axis 610 perpendicular to the axis oriented along the distance between the said buttons 321 and 521 or perpendicular to a plane containing the central axis of the buttons which are oriented in the direction of displacement of the said buttons, the said axis 610 of oscillation of the rocker lever 600 being provided at an intermediate point of the said rocker lever 600 and oriented perpendicularly to the longitudinal extension of the said rocker lever and the said rocker lever being positioned in contact with the heads of the said buttons, such that acting alternatively on one of the two opposite ends 620, 630 of the said rocker lever 600 one corresponding button of the said two buttons is operated in order to open the valve, while the other button is maintained un-activated or at rest in a position corresponding to the closed position of the corresponding valve.

According to a further feature provided in combination with the above embodiment, the said rocker lever 600 is provided on a supporting socket 700 which can be secured in a detachable way to the body 1 of the handpiece of the command and control device.

The detachable supporting socket 700 for the rocker lever 600 has an end 710 which is configured as a clamping organ configured to cooperate in an engageable and disengageable way with clamping seat 720 provided on the body of the handpiece 1.

The other opposite end of the said support means 700 bears the supporting axis 610 of the rocket lever, the said rocket lever 600 being provided with a seat for rotatably engaging the said supporting axis 610.

According to an embodiment, the said supporting socket 700 and the said clamping seat 720 on the body 1 of the handpiece are positioned in between the two valves for inflating the air chamber and for controlling the discharge from the air chamber.

According to still a further embodiment, the said clamping organ provided at the end of the supporting socket opposite the rocket lever 600 is configured as an elastically clamping clip.

In one variant embodiment the said clamping clip comprises two arms 730 which can be elastically open apart one from the other and which bears on the facing sides each one on tooth 740, the said tooth cooperating with a clamping seat on the body of the handpiece consisting in a clamping opening or depression 750.

According with a further optional feature which is illustrated in FIGS. 5 and 6 by way of example and in a not limiting way, the rocket lever 600 abuts with its two ends at the same time on the top side of the buttons 321, 521.

In still a further optional variant embodiment, the rocket lever abuts against the top side of the buttons 321 and 521 through a cushion 650 interposed between the said button and the facing side of the rocket lever.

The invention claimed is:

1. A command and control assembly for inflating and deflating a hydrostatic balancing jacket, comprising:
   a primary supply duct configured to be connected to an end of an air chamber of the hydrostatic balancing jacket and having, at an opposite end, a hand piece provided with a mouthpiece;
   a connection socket provided on said hand piece, the connection socket being in fluid communication with a secondary supply duct configured to be connected to a compressed air tank;
   a pneumatic actuation duct that actuates a discharge valve of said hydrostatic balancing jacket and that is in fluid communication with said secondary supply duct; and
   a first control system of a delivery from said secondary duct, a second control system of a delivery to said pneumatic actuation duct, and a third control system of a delivery from said mouthpiece, which are arranged on said hand piece,
   wherein said hand piece is provided with an axial duct communicating at one end with said primary supply duct and, at an opposite end, with said mouthpiece,
   wherein said first control system and said second control system comprise two valves having seats that are shaped radially with respect to said hand piece and juxtaposed to one another, and in fluid communication with one another by way of a duct obtained in said hand piece and coaxial to the connection socket of the secondary supply duct and in fluid communication therewith,
   wherein said two valves are operated alternatively by a unique actuation organ,
   wherein each of the two valves comprises an actuation button, and
   wherein the buttons of the two valves are placed in proximity of each other but at a distance,
   further comprising a rocker lever disposed to oscillate around an intermediate axis perpendicular to a longitudinal extension of the rocker lever, said rocker lever having two opposite ends on opposite sides of the intermediate axis, the two opposite ends of the rocker lever being positioned to be each in contact with one of the actuation buttons, such that, by pressing on one of the two opposite ends of the rocker lever, one of the actuation buttons is operated so as to operate one of the two valves, another one of the actuation buttons remaining inactive or at rest in a position that does not operate another one of the two valves.

2. The command and control assembly according to claim 1, wherein said pneumatic actuation duct is coaxial to said primary supply duct, and inserted therein.

3. The command and control assembly according to claim 1, wherein the rocker lever is mounted on a supporting socket, which is detachably mounted on a body of the hand piece.

4. The command and control assembly according to claim 3, wherein the supporting socket has, at one end, a clamping organ elastically engageable with a clamping seat on the body of the hand piece.

* * * * *